United States Patent [19]

Jackson et al.

[11] Patent Number: 4,592,716
[45] Date of Patent: Jun. 3, 1986

[54] MACHINE FOR MOLDING ELONGATED WORKPIECES

[75] Inventors: Robert C. Jackson, Cedar Falls; Patrick M. Luchsinger, Waterloo, both of Iowa

[73] Assignee: Deere & Company, Moline, Ill.

[21] Appl. No.: 305,298

[22] Filed: Sep. 22, 1981

[51] Int. Cl.⁴ ............................................. B29C 39/04
[52] U.S. Cl. .................................... 425/330; 249/162; 425/444; 425/450.1
[58] Field of Search ................... 249/93, 94, 162, 171, 249/172, 144, 146; 264/272.19, 328.6; 425/330, 450.1, 451.5, 444

[56] References Cited

U.S. PATENT DOCUMENTS 3,626,051 12/1971 Liautaud ........................ 264/272.19
3,931,951 11/1976 Fougea ................................ 249/172
3,999,736 12/1976 Theodorsen ........................ 249/162

*Primary Examiner*—Donald Czaja
*Assistant Examiner*—V. Fischbach

[57] ABSTRACT

A mold for molding elongated workpieces is comprised of three vertically oriented quadrants and a fourth quadrant pivotally mounted relative to the three quadrants between a mold open position and a generally vertically oriented mold closed position. A workpiece is loaded into the mold by positioning end plates on the workpiece and locating the combination on the fourth quadrant by positioning of the end plates on locating pins projecting from a frame member or tilt beam associated with the fourth quadrant. Slide assemblies are then moved into workpiece engaging positions on each end of the workpiece to accurately locate the workpiece relative to the fourth quadrant. The fourth quadrant with the workpiece locked thereon is then moved into a mold closed position for molding. Following the molding cycle the fourth quadrant is then lowered to a mold open position and an ejection mechanism is used to elevate the workpiece and end plates above the locating pins for easy removal of the workpiece and end plates from the fourth quadrant.

3 Claims, 14 Drawing Figures

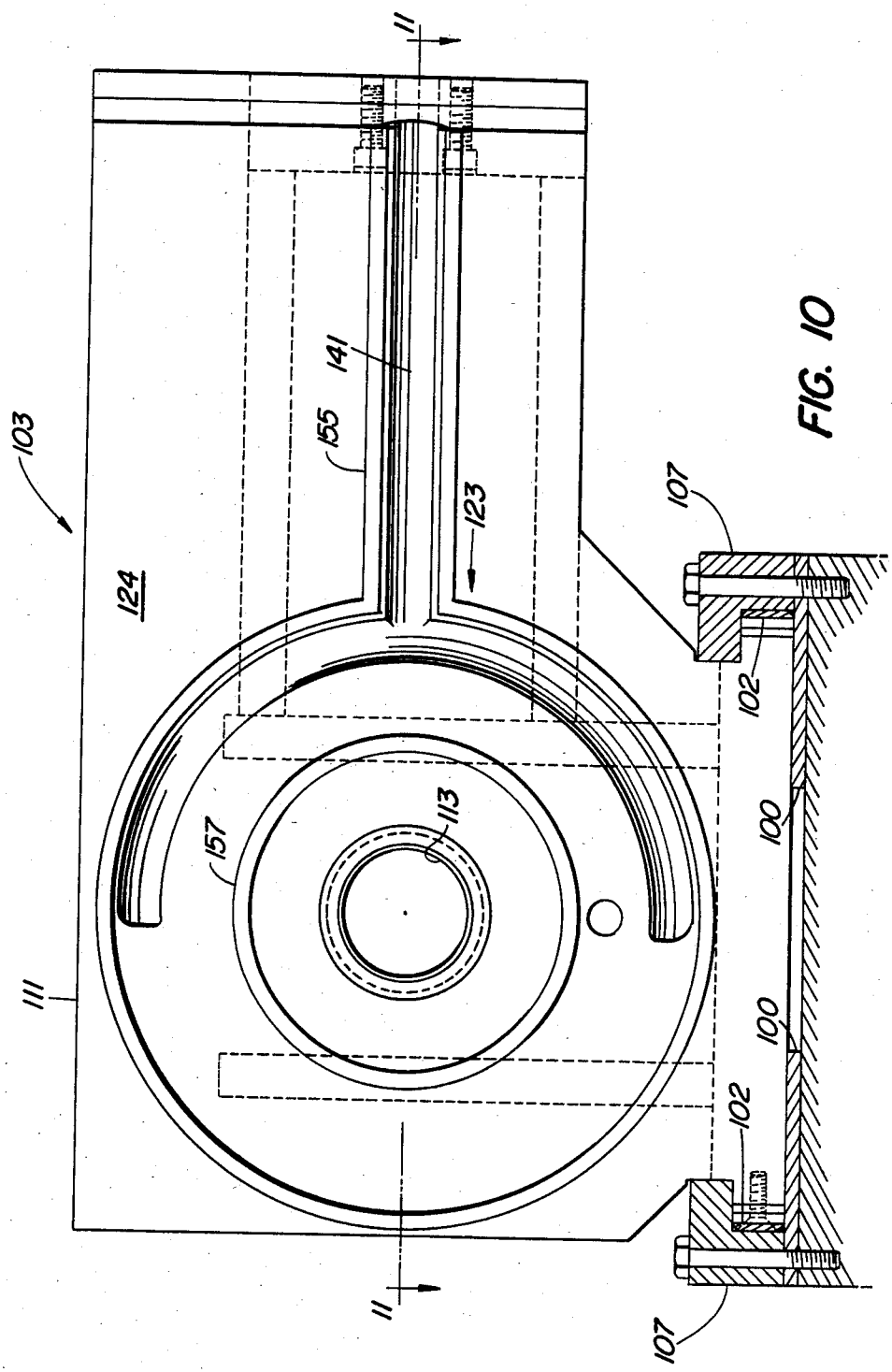

MACHINE FOR MOLDING ELONGATED WORKPIECES

CROSS REFERENCE TO RELATED APPLICATION

Application Ser. No. 304,510 filed simultaneously herewith in the name of Luchsinger, entitled MACHINE FOR MOLDING ELONGATED WORKPIECE and assigned to the assignee of the invention herein is directed to a molding machine for elongated workpieces comprising an end plate and cap slide assembly for supporting and accurately locating a workpiece in the mold cavity of the mold and an ejection mechanism for aiding in the removal of the completed workpiece from the mold quadrant to which the workpiece is fixed for molding. The invention disclosed and claimed in application, Ser. No. 304,510 is disclosed herein only for the purpose of completeness of description of the operative environment of the invention claimed herein and thus forms no part of the invention claimed herein.

BACKGROUND OF THE INVENTION

This invention relates to a method and a machine for molding and more particularly relates to a method and machine for molding elongated and preferably generally cylindrical workpieces of a composite construction of plastic on a core. The invention herein has particular utility for the manufacture of rolls such as those used to condition may and which typically consist of a steel core with a resilient outer covering.

One well known process for molding parts of polyurethane is called reaction injection molding. In brief, the process consists of feeding isocynate and polyol from a mixing head into a mixer where they are mixed together just prior to injection of the mixture into the mold cavity. The mixture after curing forms the polyurethane part.

One known machine for the manufacture of workpieces such as conditioner rolls with a reaction injection molding process is comprised of four elongated mold segments which form a cylindrical mold cavity therebetween. One of the mold segments is fixed to a pivotable frame. A second and third of the mold quadrants are slidably movable (in a direction perpendicular to the mold axis) on the frame toward and away from the first quadrant between a mold closed and a mold open position. A fourth quadrant is mounted on the frame for linear movement toward and away from the first quadrant and is pivotable about an axis parallel to the mold cavity axis. The fourth quadrant is movable to a mold open position first by movement perpendicularly away from the first segment and then pivotal movement about an axis parallel to the mold axis. For movement to a mold closed position the foregoing movements are reversed.

The steps of operation of the machine are (1) load the workpiece into the open mold disposed with the mold cavity axis and all quadrants in a horizontal plane (2) move the second, third and fourth mold segments from a mold open to a mold closed condition (3) lock the mold segments together with clamps or latches (4) move the mold from a horizontal to a vertical position to ensure even filling of the mold cavity without air entrapment (5) fill the mold from the lower end with the reaction injection molding mixing head (6) return the mold to a horizontal position (7) open the mold latches (8) open mold segments and (9) remove completed roll. The prior art mold was found to be disadvantageous because it required repositioning or tipping of the entire mold from a horizontal to a vertical location. This disadvantage is typically found in molds for long thin parts or workpieces such as rolls which require filling in one position and unloading from the mold in another.

Accordingly, an object of this invention is to provide a machine for molding large elongated workpieces, the major components of which do not require substantial relocation during the steps of loading, molding and unloading a workpiece.

Another object of this invention is to provide a mold for elongated workpieces which has three of its four quadrants located in a vertical position and has its remaining quadrant movable between an inclined position for loading of the workpiece and a vertical position for closing of the mold.

Another object of this invention is to provide a mold with an improved runner system formed in an end plate of the cavity for uniformly channeling molding material into the mold cavity.

SUMMARY OF THE INVENTION

These and other objects of the invention are accomplished by a molding machine preferably comprised of four elongated quadrants. For other types of workpieces, fewer than four mold cavity-forming segments may be used. In accordance with the four quadrant design, a first of the quadrants is fixed to a frame and is generally vertically oriented. A second and third of the quadrants are generally vertically oriented and are movable preferably slidably toward and away from first quadrant between a mold closed and a mold open position, respectively. A fourth of the quadrants is pivotally mounted at one end relative to the first quadrant and is movable toward and away from the first quadrant between a vertical, closed and an inclined, open position. In a closed condition, the four quadrants together define a centrally located mold cavity with a generally vertical, longitudinal axis.

In accordance with the method of this invention, a mold is provided with three generally vertically oriented quadrants and with a fourth quadrant which is pivotally mounted relative to said three quadrants between a mold open position and a generally vertically oriented mold closed position. The workpiece is positioned on the fourth quadrant when it is located in a mold open position and the fourth quadrant is moved to the mold closed position.

BRIEF DESCRIPTION OF THE DRAWINGS

FIG. 10 is an elevational view of one slide assembly used for positioning and locking a workpiece in the mold quadrant shown in FIG. 4 taken along lines 10—10.

DESCRIPTION OF THE PREFERRED EMBODIMENT

The invention has general utility for the molding of large elongated workpieces. The invention will be explained in accordance with the preferred embodiment which is designed for molding elongated generally cylindrical conditioner rolls for a mower conditioner which is used in the harvesting of agricultural crops such as hay. The roll is comprised of a cylindrical steel core 13 (see FIGS. 4, 5) and a tubular layer (not shown), preferably, of polyurethane plastic molded onto the exterior surface of the core. The chemical process for forming the layer of polyurethane on core 13, commonly known as reaction injection molding, is a conventional and well-known process and accordingly will not be described in detail herein. The invention, of course, has general utility for other molding processes such as injection molding. The invention herein resides in the molding machine 11, per se, and the method of operation thereof.

Figure 1:
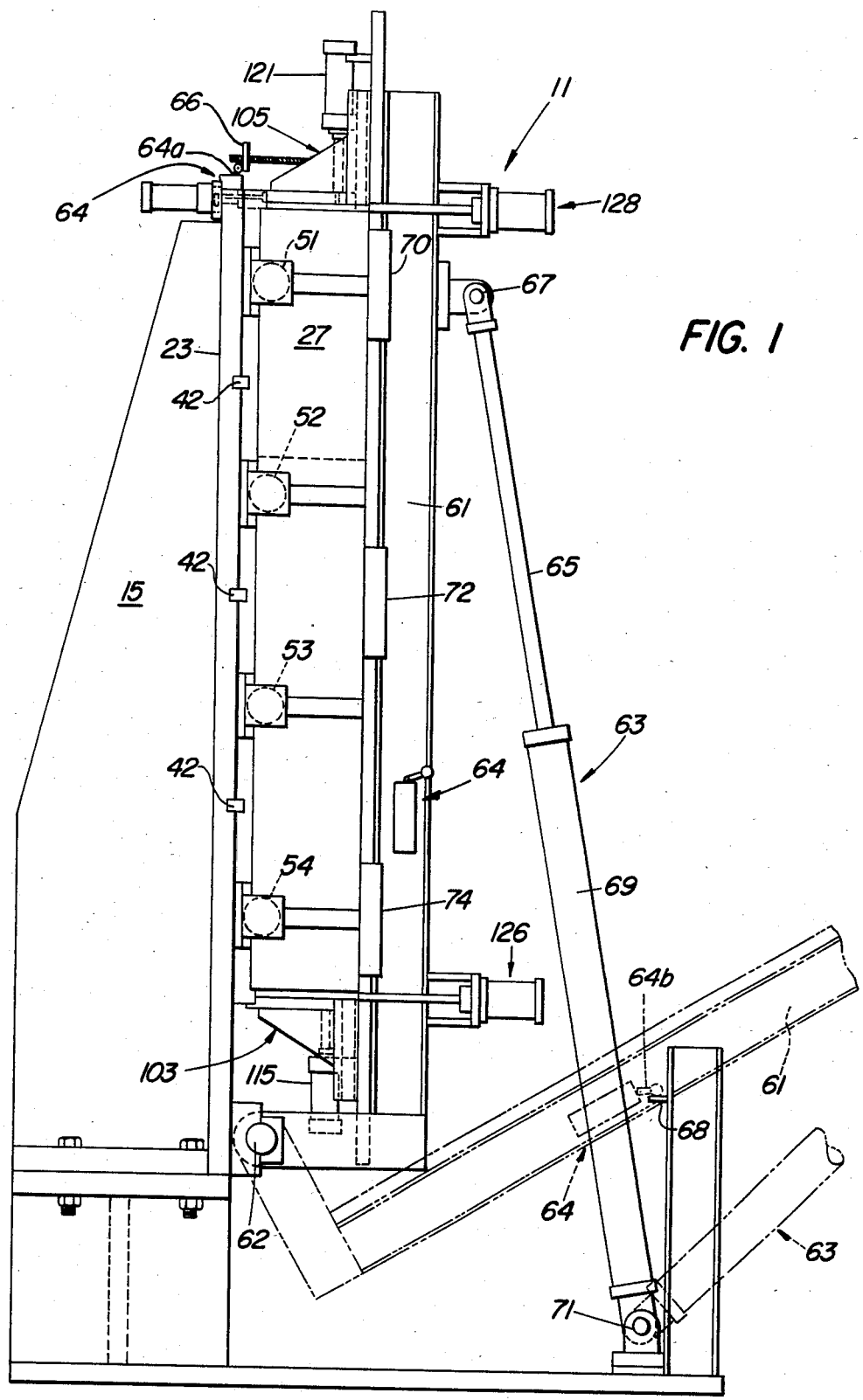
FIG. 1 is a side elevational view of a mold in accordance with the features of this invention.
Figure 2:
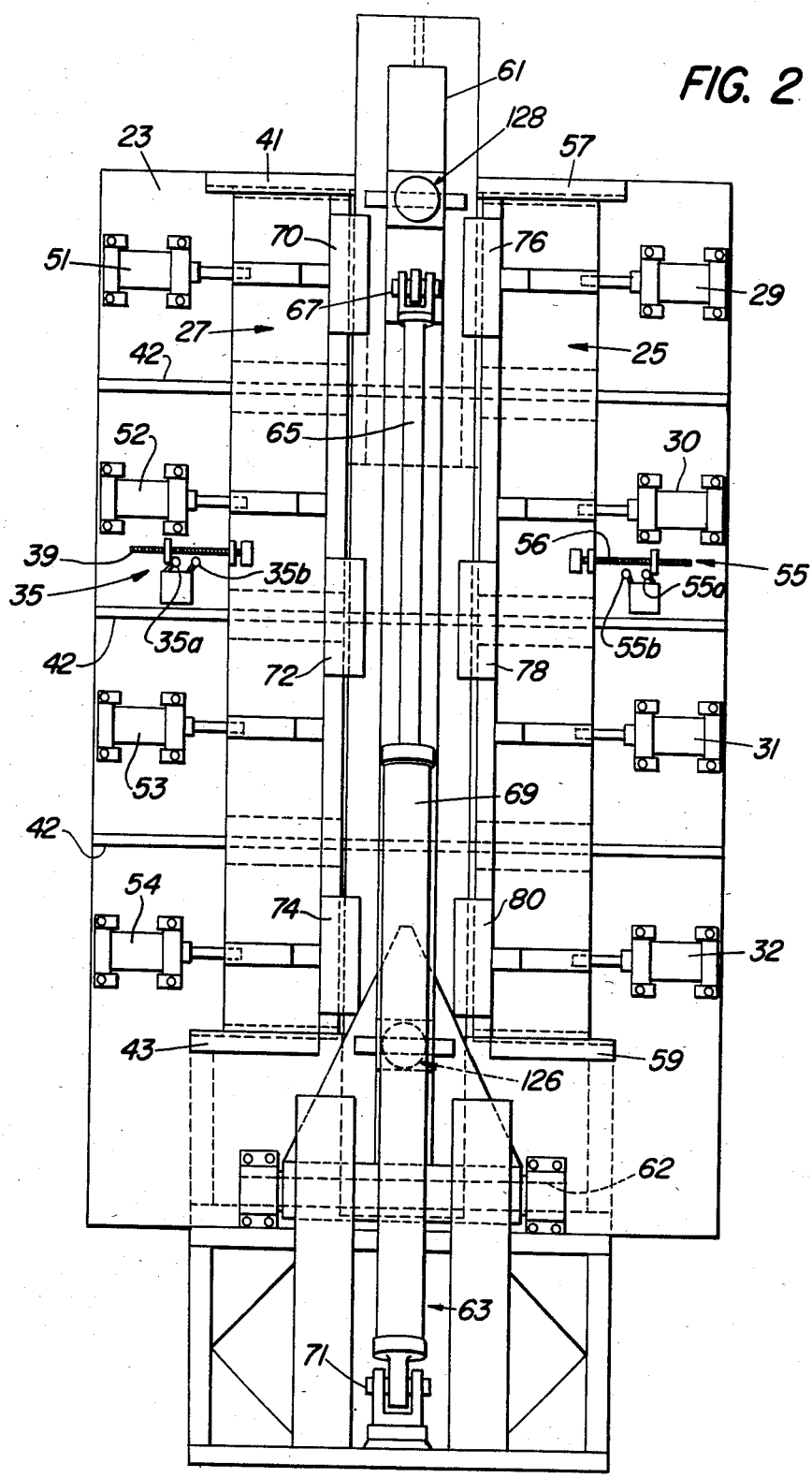
FIG. 2 is a front elevational view of the mold of FIG. 1.
Figure 3:
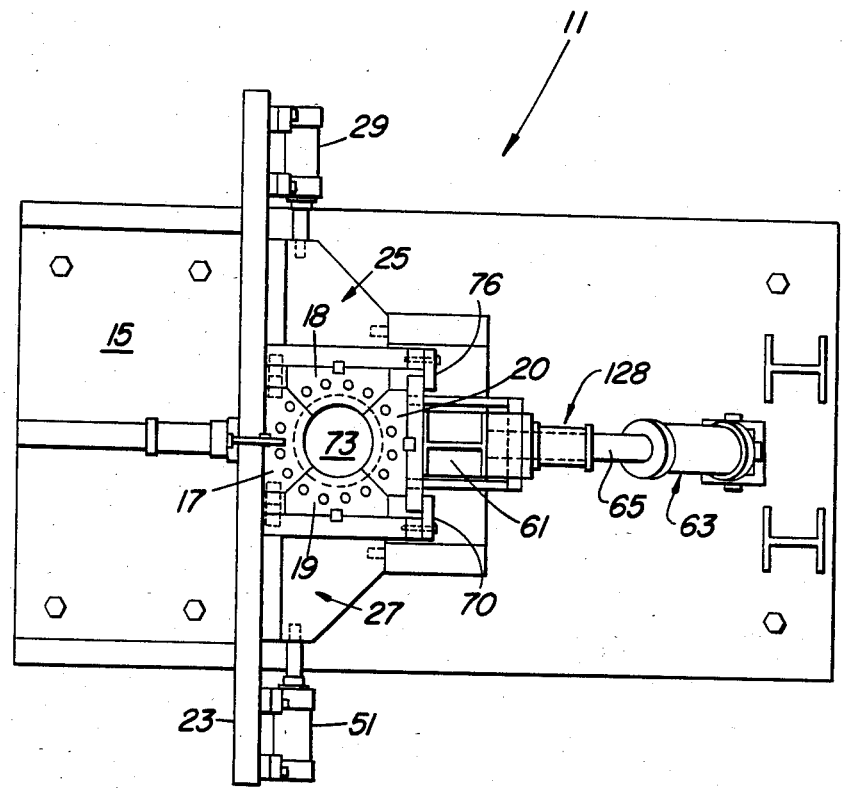
FIG. 3 is a plan view of the mold of FIG. 1 with a cap slide assembly and end plate removed to show a mold cavity.

Reference is now made primarily to FIGS. 1-3 which illustrate respectively the side elevational, front elevational and top plan view of molding machine 11 in accordance with features of a preferred embodiment of this invention. Machine 13 is comprised of a frame 15 in which a plurality of mold quadrants 17, 18, 19, 20 are mounted. Quadrant 17 is supported in frame 15 in a vertical orientation by attachment to a back wall 23. Quadrants 18, 19 are fixed respectively to quadrant slides 25, 27 of frame 15. Quadrant 18 and quadrant slide 25 are slidably movable toward and away from quadrant 17 between a mold closed and a mold open position respectively through the action of a plurality of hydraulic cylinders 29, 30, 31, 32. Location of the slide 25 at the mold closed and open positions is sensed by a limit switch assembly 35 including a pair of switches 35a, 35b (shown also in FIG. 14) fixed to wall 23 and an actuation rod 39 fixed to and movable with slide 25. Movement of slide 25 is linear and is guided by guides 41, 43 at the upper and lower edges of slide 25 and by a plurality of keys 42. Similarly, quadrant 19 and slide 27 are movable toward and away from quadrant 17 between a mold closed and a mold open position by the action of hydraulic cylinders 51, 52, 53, 54. Location of slide 27 at the mold open and closed position is sensed by a switch assembly 55 including a pair of switches 55a, 55b (also shown in FIG. 14) fixed to wall 23 and actuator rod 56 fixed to and movable with slide 27. Movement of slide 27 is linear and is guided by keys 42 and guides 57, 59 fixed to wall 23. Quadrant 20 is fixed to a tilt beam 61 pivotally mounted at 62 on back wall 23 and fixed quadrant 17. Quadrant 20 and tilt beam 61 are movable together toward and away from quadrant 17 between a mold closed and a mold open position, respectively, through the action of hydraulic cylinder 63. Location of beam 61 at the mold closed and mold open positions is sensed by a limit switch assembly 64 including a switch 64a, (also shown in FIG. 14) fixed to wall 23, switch 64b fixed to beam 61, an actuator rod 66 fixed and movable with beam 61 and actuator rod 68 fixed to frame 15. Cylinder 63 includes a piston rod 65 pivotally mounted at 67 to tilt beam 61, and a piston housing 69 pivotally mounted at 71 to frame 15. FIGS. 1, 3 illustrate the mold closed condition of quadrant 20. The mold open position is illustrated in FIG. 1 by the fragmentary dotted line position of quadrant 20, tilt beam 61 and hydraulic cylinder 63. As illustrated in FIG. 3 (with parts omitted for clarity), when quadrants 18, 19, 20 are in their respective mold closed positions, a cylindrical mold cavity 73 is formed.

The mold is closed by first closing tilt beam 61 and then closing quadrant slides 25, 27. Slides 25, 27 are provided with a plurality of locking plates 70, 72, 74, 76, 78, 80 for engaging the outer surface of beam 61 and holding beam 61 firmly in place during the molding cycle.

Figure 4:
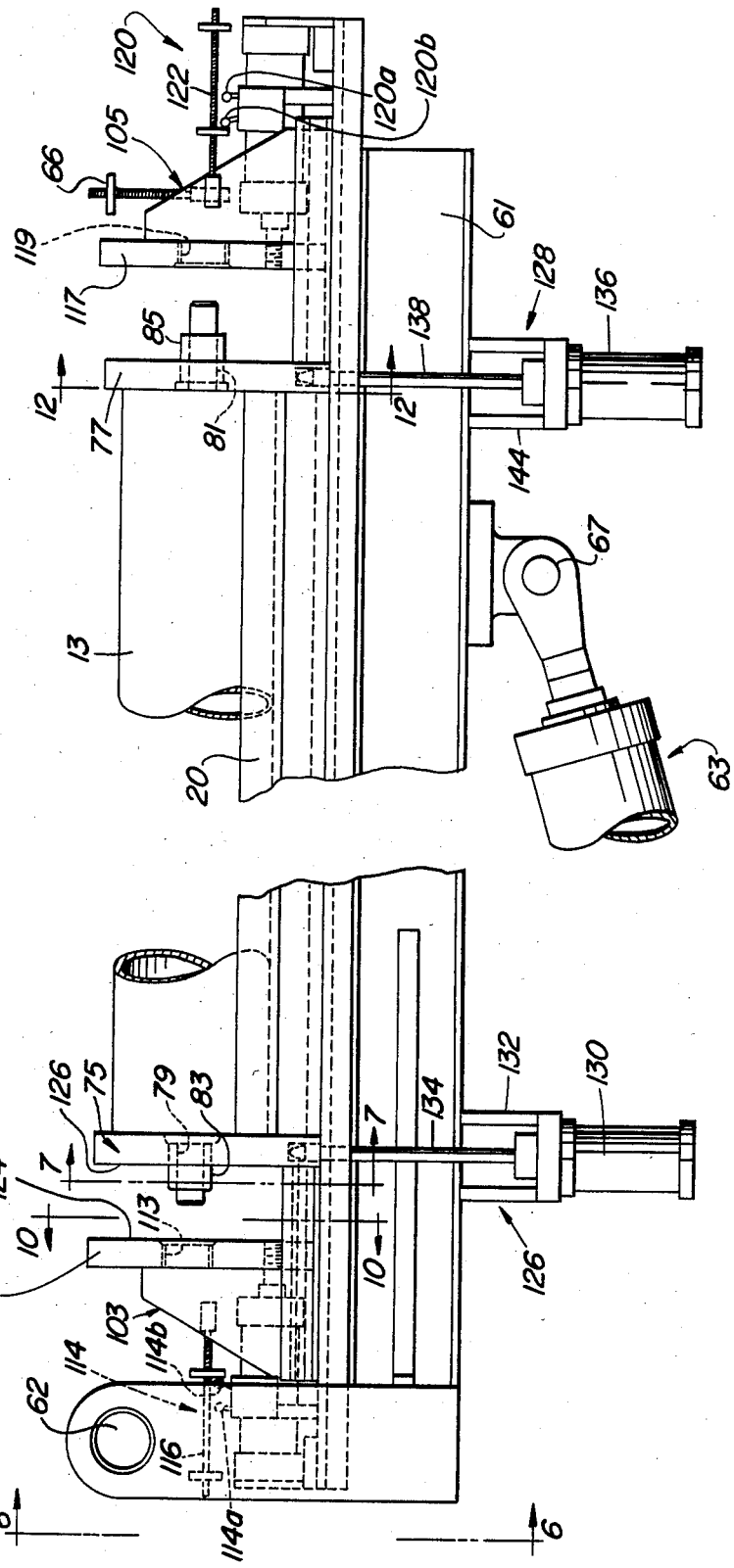
FIG. 4 is a fragmentary side view of one quadrant of the mold of FIG. 1 with a workpiece located therein prior to molding.
Figure 5:
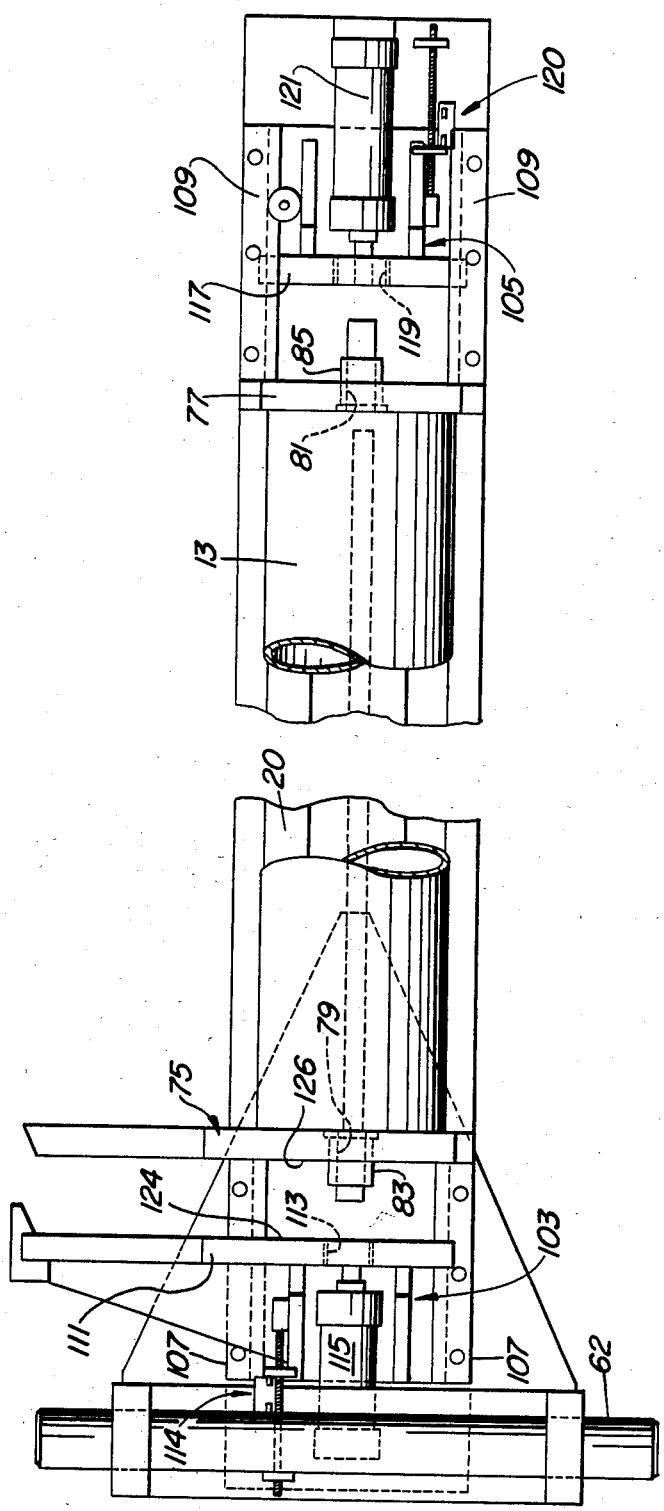
FIG. 5 is a plan view of the quadrant shown in FIG. 4.
Figure 8:
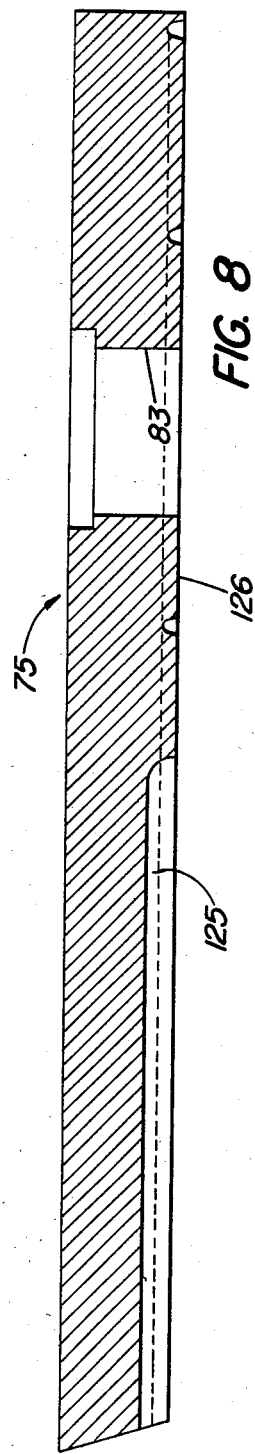
FIG. 8 is a cross-sectional view of the end plate shown in FIG. 7 taken along lines 8—8.
Figure 6:
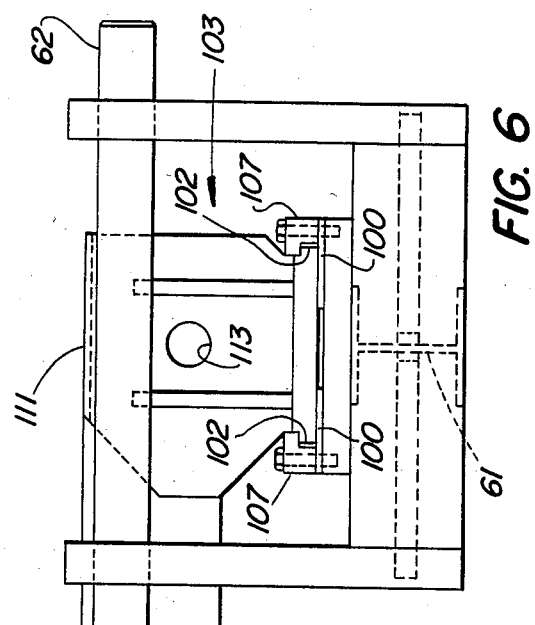
FIG. 6 is an end view of the quadrant shown in FIG. 4 taken along line 6—6.
Figure 9:
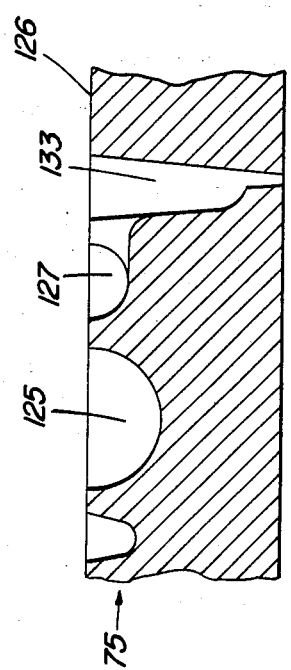
FIG. 9 is a fragmentary cross-sectional view of the end plate shown in FIG. 7 taken along lines 9—9.

Reference is now made to FIGS. 4, 5 illustrating further details of tilt beam 61 through which a workpiece 13 is mounted on quadrant 20 for loading into cavity 73. Tilt beam 61 is further comprised of a pair of end plates 75, 77, one function of which is to locate workpiece 13 generally relative to quadrant 20. End plates 75, 77 include a pair of centrally located bushings 79, 81 for receiving cylindrical projections 83, 85 mounted at each end of workpiece 13. Tilt beam 61 further includes means for locating end plates 75, 77 thereon. The locating means may be comprised of any one of a plurality of mechanical fittings and are here illustrated by a first pair of laterally spaced pins 87, 89 (FIG. 7) projecting from an inner wall 90 for locating end plates 77 by insertion into slightly-oversized openings 91, 93 formed in the lower edge of plate 75. End plate 77 is similarly located with respect to cavity beam 61 on a laterally spaced pair of pins 91, 93 projecting from inner wall 90 of tilt beam 61. End plate 77 is located on pins 91, 93 by insertion into a corresponding pair of slightly-oversized holes 99, 101 formed in the lower edge of plate 77.

Tilt beam 61 further comprises a pair of cap slide assemblies 103, 105 for accurately locating and locking workpiece 13 and end plates 75, 77 to quadrant 20. Each assembly 103, 105 is movably mounted respectively in quides 107, 109 for back and forth movement relative to the exterior faces of end plates 75, 77 between workpiece engaged and disengaged positions. Assembly 103 includes a face plate 111 with a centrally disposed opening 113 formed therein for receiving workpiece projection 83 when assembly 103 is slid toward workpiece 13 or to the left in FIG. 5. Sliding movement of assembly 103 is controlled by hyraulic cylinder 115. Location of the slide assembly 103 at the workpiece engaged and disengaged positions is sensed by a switch assembly 114a, 114b (also shown in FIG. 14) fixed to tilt beam 61 and actuator rod 116 fixed to and movable with slide assembly 103. Similarly, slide assembly 105 is comprised of a face plate 117 with an opening 119 formed therein for receiving workpiece projection 85 therein. Back and forth movement of slide 105 relative to end plate 77 is accomplished through the action of hydraulic cylinder 121. Location of slide assembly 105 at the workpiece engaged and disengaged positions is sensed by a switch assembly 120 including a pair of switches 120a, 120b (also shown in FIG. 14) fixed to tilt beam 61 and an actuator rod 122 fixed to and movable with slide assembly 105. When slide assemblies 103, 105 are moved forward to receive bushings 79, 81, respectively, workpiece 13 is accurately located on tilt beam 61 by the camming action of the walls of opening 113, 119 on bushing 79. 81. Such action results in the slight shifting of end plates 75, 77 on pairs of pins 87, 89 and pins 91, 93.

Figure 7:
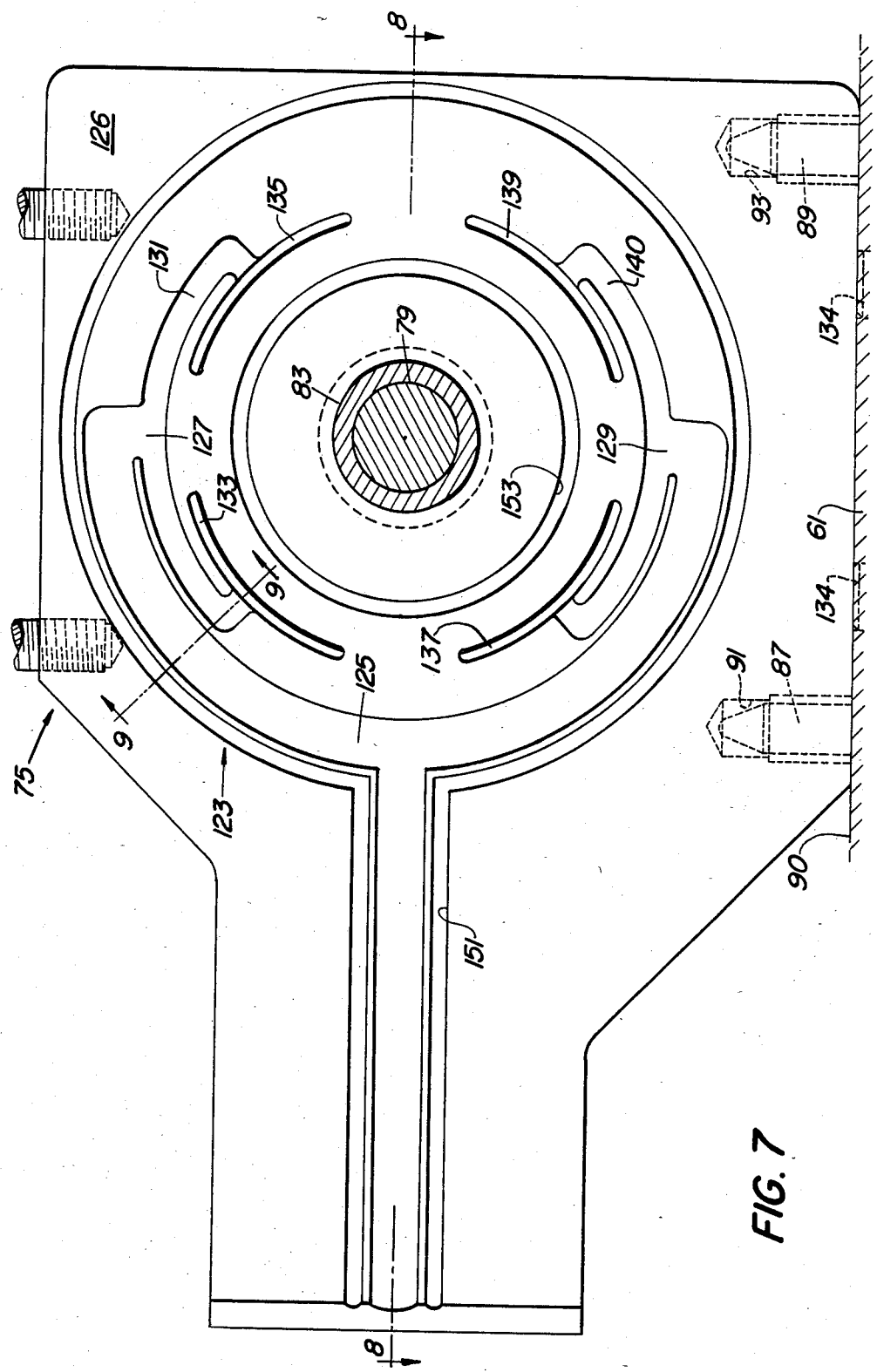
FIG. 7 is an elevational view of an end plate used for locating a workpiece in the quadrant shown in FIG. 4 taken along lines 7—7.
Figure 11:
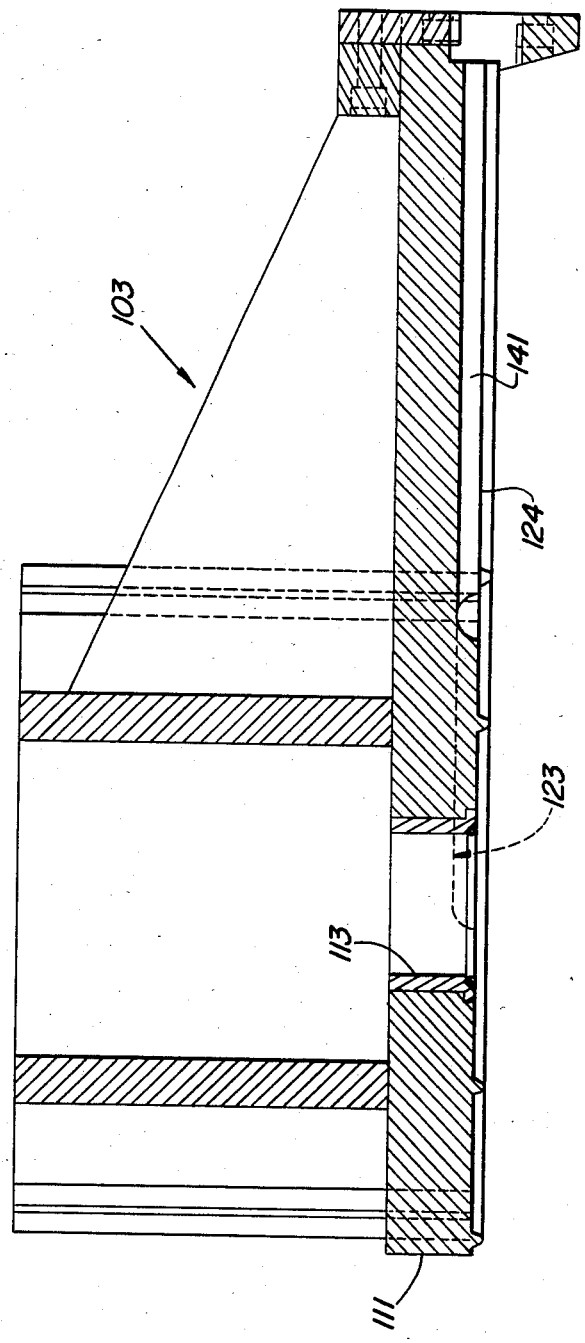
FIG. 11 is a cross-sectional view of the slide assembly shown in FIG. 10 taken along lines 11—11.
Figure 12:
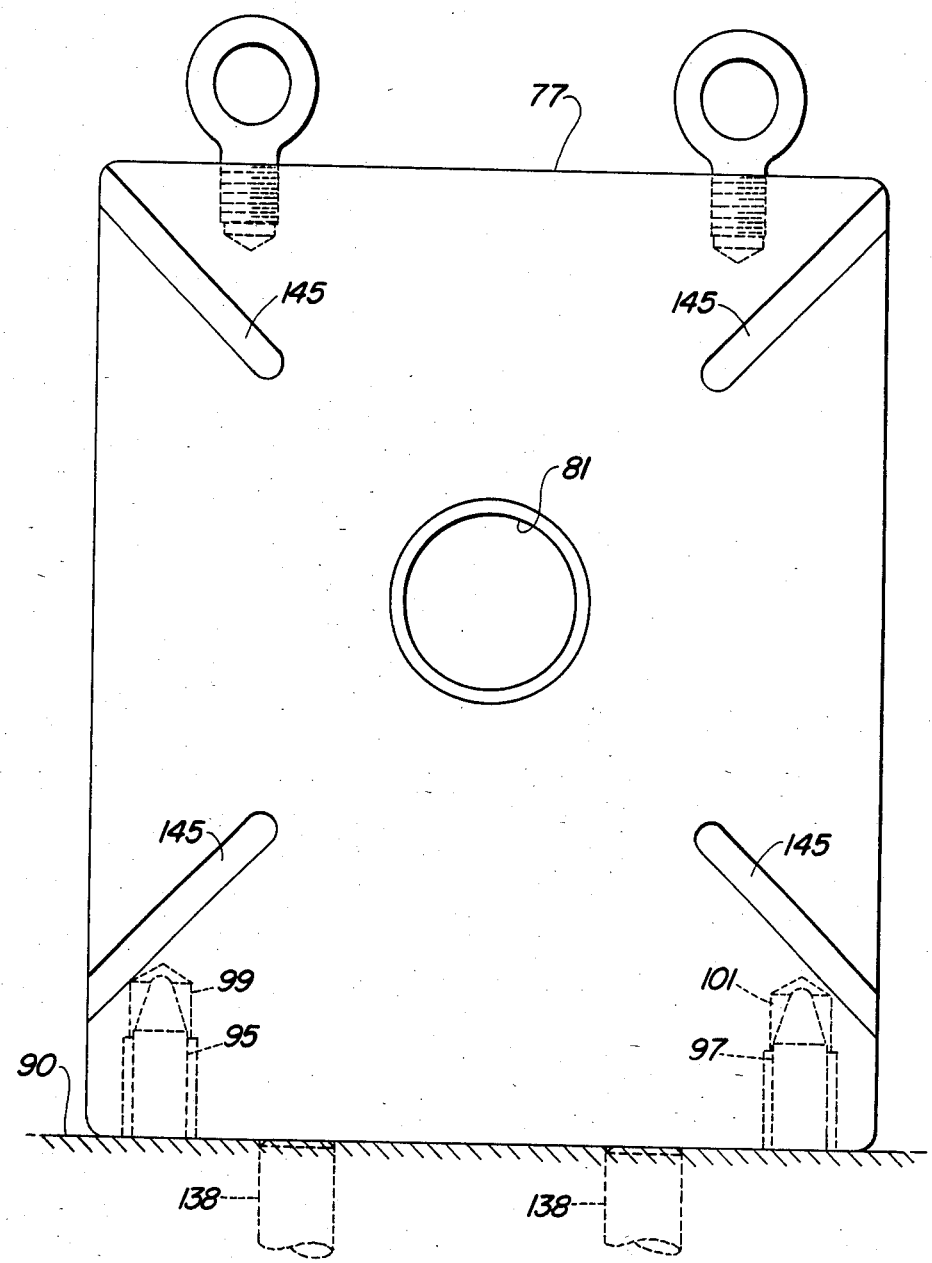
FIG. 12 is an elevational view of a second end plate used for locating a workpiece in the quadrant shown in FIG. 4 taken along lines 12—12.

Reference is now made to FIGS. 4, 7, 12 which show a pair of hydraulically controlled ejection mechanisms 126, 128 which aid in the ejection of the workpiece 13 from quadrant tilt beam 61. Mechanism 126 is comprised of a hydraulic cylinder 130 fixed to beam 63 via a bracket 132, and a "U" shape plunger 134 having a free end reciprocally movable by action of cylinder 130 through openings in beam 61 to elevate end plate 75 from pins 87, 89. Similarly, ejection mechanism 128 is comprised of a hydraulic cylinder 136, bracket 144 mounting cylinder 136 to beam 61, and a "U" shaped plunger 138 reciprocally slidable by action of cylinder 136 through beam 61 for engagement with end plate 77. Cylinders 130, 136 are simultaneously actuable via conventional circuit (not shown) to elevate end plates 75, 77 above pins 87, 89 and pins 99, 101 so that binding does not occur during unloading of workpiece 13.

As best seen in FIGS. 7-10, face plate 111 of slide assembly 103 and end plate 75 together form a runner system 123 for mixing and channeling liquid molding material into cavity 73. Portions of runner system 123 are formed on the exterior face 126 of end plate 75 and other portions of runner system 123 are formed on the interior face 124 of plate 111. These portions are mated together to complete the runner system when slide assembly 103 is moved forwardly to engage the exterior face 126 of end plate 75 with the interior face 124 of plate 111. The directions of flow of the material is runner system 123 in the contiguous planes of faces 126, 124. Viewing FIG. 7, runner system 123 is comprised of an outer, first section 125 terminating at two diametrically opposed points 127, 129. At termination point 127, section 125 is interconnected to an inner, second section 131 of a reduced size compared to section 125. Inner section 131 terminates at 135 into a pair of spaced openings 133, 135 through plate 75. Similarly, first section 125 terminates at its other end 129 into a third section 140 of a reduced size compared to first section 125. Third section 131 terminates at a pair of spaced openings 137, 139 through plate 75. Openings 133, 135, 137, and 139 are identically sized and are symmetrically arranged such that location 133 is diametrically opposed to section 139 and location 135 is diametrically opposed to location 137. Viewing FIG. 10, face place 111 has formed therein a first section 141 identically mating with first section 125 formed in plate 75. Through the design of runner system 123, molding material is mixed by turbulent flow at a fork 142 in section 125 and at termination points 127, 129 of section 125 at openings 133, 135, 137, 139 and enters in cavity 73 at a uniform, evenly distributed rate through openings 133, 135, 137, 139 in end plate 75 into cavity 73.

The size of openings 133, 135, 137, 139 to provide a nonturbulent entry of the material into cavity 73 is determined based on the rate of flow of the material through the runner system 123 and the density of the material. The uniform evenly distributed filling of cavity 73 is critical to prevent entrapment of air in the molding material as it flows into cavity 73. Runner system 123 is further sealed to prevent air leakage and air entrapment in the material during filling by grooves 151, 153 on end plate 75 which mate with tongues 155, 157 on plate 111. The sealing action is enhanced by the placing of a silicone sealing material in groove 151, 153. Entrapment of air in the molding material results in a defectively molded part.

Viewing FIG. 12, venting of cavity 73 during filling is accomplished via vents 145 formed in an inner face 147 of end plate 77.

Figure 13:
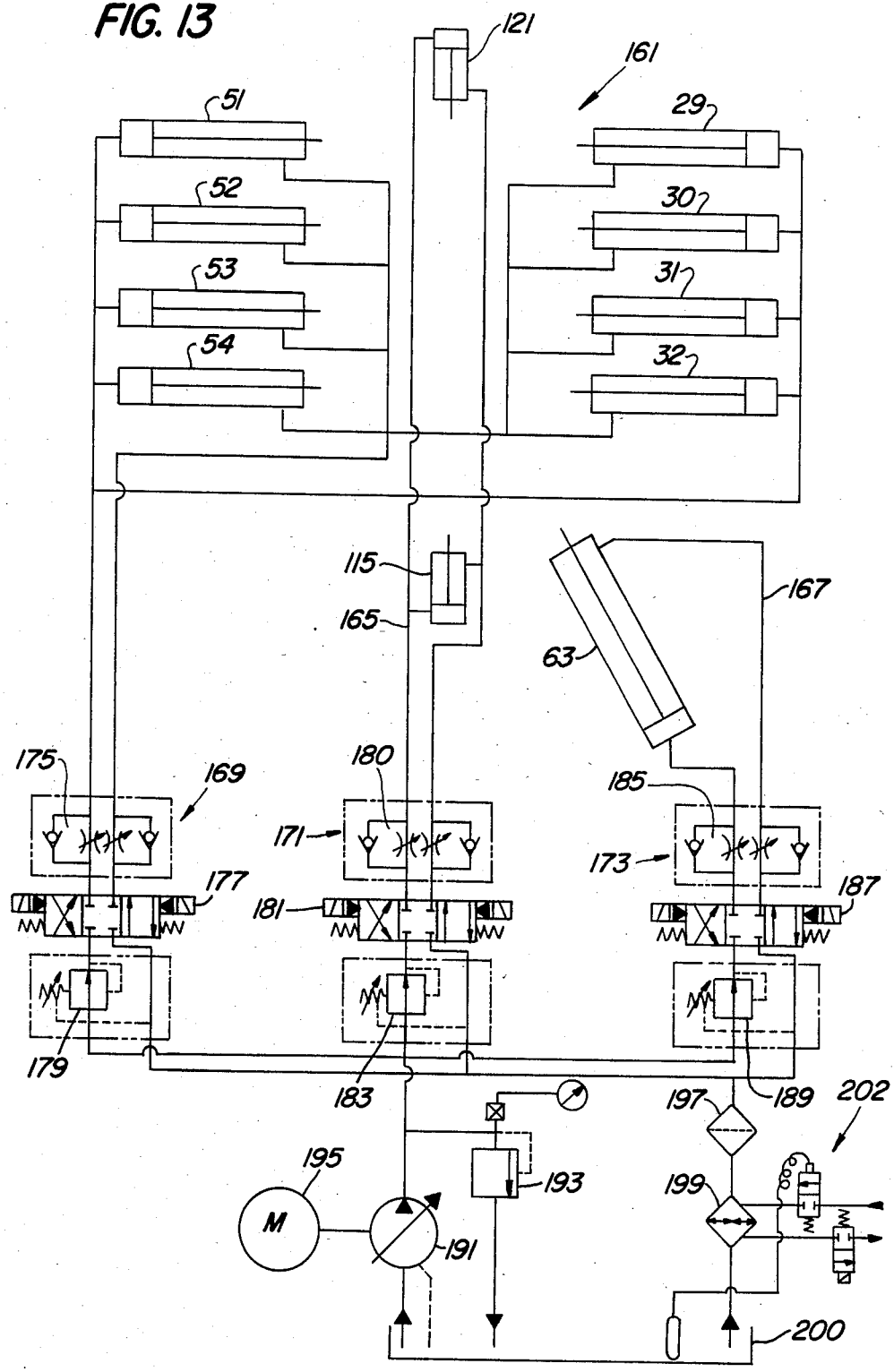
FIG. 13 is a schematic of a hydraulic circuit for the mold of FIG. 1.

Reference is now made to FIG. 13 which illustrates a hydraulic circuit 161 for the hydraulically controlled operations of molding machine 11. The components, per se, of circuit 161 are conventional and will only briefly be described herein. Circuit 161 is comprised of three subcircuits, namely, subcircuit 163 for operation of hydraulic cylinders 29-32, 51-54 for quadrant slide 25, 27; subcircuit 165 for hydraulic cylinders 115, 121 for cap slide assemblies 103, 105; and subcircuit 167 for hydraulic cylinder 63 for tilt beam 61. In subcircuit 163, hydraulic cylinders 29-32 and 51-54 are connected in parallel and are connected in circuit with a valve assembly 169 including an adjustable flow control and bypass valve 175; a four-way, three position, solenoid-operated, spring centered valve 177; and a manually adjustable, pressure-reducing valve 179. In subcircuit 165, cylinders 115, 121 are connected in parallel and are together in circuit with a valve assembly 171 including an adjustable flow control and bypass valve 180; four-way, three position, solenoid actuated, spring centered valve 181; and manually adjustable, pressure-reducing valve 183. In subcircuit 167, cylinder 63 is connected in circuit with valve assembly 173 including an adjustable flow control and bypass valve 185; four-way, three position, spring centered, solenoid actuated valve 187 and manually adjustable, pressure-reducing valve 189. As is apparent, valve assemblies 169, 171, 173 are identical. Each subcircuit 163, 165, 167 is connected in circuit with a hydraulic pump 191 having a relief valve 193 and driven by a motor 195.

In subcircuit 163, hydraulic fluid is pumped from pump 191, in sequence, through manually adjustable, pressure-reducing valve 179, valve 177 (when actuated either to the right or to the left) and the bypass valve of flow control valve 175 and finally to cylinders 29-32, 51-54. Fluid is returned from cylinders 29-32, 51-54, in sequence, through flow control valve 175, valve 177 (actuated either to the right or the left) a filter 197 and a heat exchanger 199 and finally into reservoir 200. Heat exchanger 199 is connected to a thermostatically controlled water cooling mechanism 202. The flow of hydraulic fluid through subcircuits 165, 177 is identical to that explained for subcircuit 163 (except, of course, in each instance flow is through identical valve assemblies 171, 173 rather than valve assembly 169) and will not be explained further herein.

Mold 11 is mechanically operated as follows (without regard for the moment for the operation of an electrical control circuit 201 therefor which will be explained hereinafter in connection primarily with FIG. 14). To load workpiece 13 in mold 11, first, end plates 75, 77 are positioned respectively on projections 83, 85 of workpiece 13. The workpiece 13 with the end plates 75, 77 thereon is then loaded into quadrant 20 on tilt beam 61 which is in the mold open position illustrated in FIGS. 4, 5 and in dotted lines in FIG. 1. As shown in FIGS. 4, 7, 12, end plates 75, 77 are located on quadrant 20 on tilt beam 61 by positioning openings 91, 93, respectively, over pins 87, 89 and openings 99, 101 over pins 95, 97. With the end plates 75, 77 so positioned, a workpiece is generally properly located relative to quadrant 20. Hydraulic cylinders 115, 121 are actuated by shifting valve 181 to the left (FIG. 13) to move cap slide assemblies 103, 105 into the workpiece engaging position. Openings 113, 119 receive therein projections 83, 85 to complete the accurate location of workpiece 13 relative to quadrant 20. The accurate location of workpiece 13 takes place as a result of a slight camming action (if necessary) provided by openings 113, 119 on bushings 79, 81, respectively. Slight shifting of end plates 75, 77 is permitted, if necessary, as openings 91, 93, and openings 99, 101 are slightly oversized relative to pins 87, 89 and pins 95, 97, respectively. Hydraulic cylinder 63 is then actuated to move tilt beam 61 from the mold open to the mold closed position by shifting valve 187 to the left (FIG. 13). The tilt beam 61 now assumes the position shown in full lines in FIGS. 1, 2 and 3. Quadrant slides 25, 27 are then shifted from the mold open to the mold closed position by hydraulic cylinders 29-32, 51-54 by shifting valve 177 to the left (FIG. 13). Tilt beam 61 is now locked in place by locking plates 70, 72, 74, 76, 78, 80. Mold 11 is now completely closed with workpiece 13 accurately located therein and is ready for injection of plastic molding material.

Molding material injection equipment is coupled to the runner system 125 formed by cap slide assembly 103 and end plate 75. Material is then injected into the base of the mold cavity 73 by passing, in sequence, through outer section 125, inner section 127 and symmetrically located openings 133, 135, 137, 139. Material enters cavity 73 with a mutually equal rate of flow from all openings 133, 135, 137, 139 so that cavity 73 is filled nonturbulently and uniformly from the base. Filling in this manner reduces the entrapment of air in the material. As the cavity fills, air is exhausted from cavity 73 through vents 145 formed in end plate 77.

Following injection of the plastic molding material, and curing of the molding material, the mold is opened by shifting quadrant slides 25, 27 from the mold closed to the mold open position by shifting valve 177 to the right which retracts hydraulic cylinders 29-32, 51-54. Tilt beam 61 is then lowered from the mold closed to the mold open position shown in dotted lines in FIG. 1 by shifting hydraulic valve 187 to the right to retract hydrauic cylinder 163. Cap slide assemblies 103, 105 are then moved from the workpiece engaging to the workpiece disengaging position by shifting of hydraulic valve 181 to the right to retract hydraulic cylinders 115, 121. The workpiece 13 with a molded layer formed thereon is then ready for removal from quadrant 20. Ejection mechanisms 126, 128 are then actuated by simultaneously energizing cylinders 130, 136 to elevate end plates 75, 77 with workpiece 13 therein above pins 87, 89, 99, 101 on beam 61. The mold is now ready for the loading of another workpiece therein.

Figure 14:
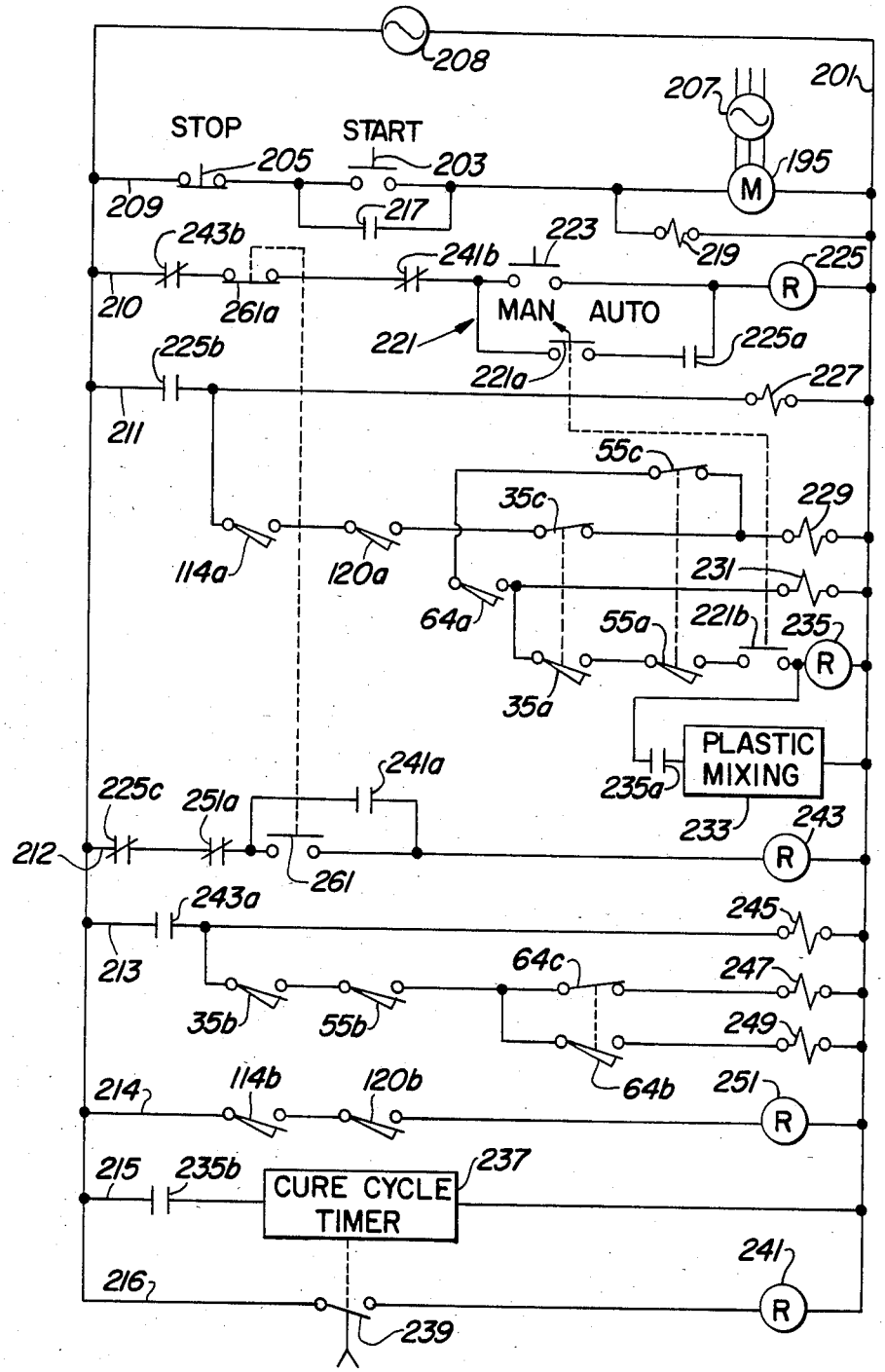
FIG. 14 is a schematic of an electrical control circuit for the mold of FIG. 1.

Reference is now made to FIG. 14 which shows a control circuit 201 for operation of molding machine 11. It will be recognized by those skilled in the art that circuit 201 is merely exemplary of the type of control circuit which may be provided in accordance with the features of this invention to automate the operation of mold 11. For simplicity, conventional circuits associated with control panel lights, safety shields for mold 11, emergency stopping of machine operation, and warning horns indicating completion of molding cycle have been omitted.

In FIG. 14, the circuit components are all shown in the deenergized condition. Circuit 201 includes start and stop switches 203, 205, respectively, and a motor power supply 207. Supply 207 is preferably a 440 volt, 3 phase, 60 Hz supply for energizing hydraulic pump motor 195. Circuit 201 also includes a power supply 208 for providing a 115 volt, 2 phase 60 Hz output across each of the parallel circuit branches 209-216. A pair of normally open contacts 217 controlled by a relay associated with motor 195 is connected in parallel across start switch 203 for maintaining conductivity of branch 210 responsive to switch 203. A solenoid 219 for actuating the water cooling assembly 202 further illustrated in FIG. 13 is connected in parallel across motor 195. In branches 210, 211 a double-acting selector switch 221 with linked switch junctions 221a and 221b permits the operator to select between manual or automatic operation of the cycle of operation of mold 11. Closing of the mold for either a manually or automatically actuated cycle is initiated through a switch 223. In series with switch 223 is a relay 225 with normally open contacts 225a in series with selector switch 221a, with normally open contacts 225b in branch 211 and with normally closed contacts 225c in branch 212. When switch 223 is closed, relay 225 closes contacts 225a and contacts 225b. If switch 221 is in the automatic position, the closing of contacts 225a initiates the automatic sequential operation of the components in the other circuit branches 210-216 to close and open mold 11. If selector switch 221 is in the manual position (221a and 221b are open) mold 11 is closed by operation of the components in branch 211. Contacts 225c prevent actuation of components in branch 212 from opening mold 11 simultaneously with components in branch 211 for closing mold 11.

In branch 211, relay contacts 225b are in series with a solenoid 227 for initiating operation of hydraulic cylinders 115, 121 (via valve 181) for moving cap slide assemblies 103, 105 into the workpiece engaged position. When slide assemblies 103, 105 reach the workpiece engaged position, limit switches 114a, 120a are closed by actuator rods 116, 122, respectively. Slide assembly limit switches 114a, 120a are connected in circuit with a solenoid 229 for actuating hydraulic cylinder 63 (via valve 187) for moving tilt beam 61 from its mold open to its mold closed position. Connection between limit switches 114a, 120a and solenoid 229 is made through switch sections 35c and 55c of double-acting limit switches 35a, 55a, respectively. Also, in circuit with switches 114a, 120a is beam limit switch 64a, which is closed when tilt beam 61 reaches its closed position, and a solenoid 231 for actuating hydraulic cylinders 29-32, 51-54 (via valve 177) for closing quadrant slides 25, 27. When quadrant slides 25, 27 are in the closed position, limit switches 35a, 55a are closed to energize a solenoid 235. Solenoid 235 controls operation of a plastic mixing circuit 233 via contacts 255a. Assuming switch 221b is closed for automatic operation, mixing circuit 233 is operated when switches 35a, 55a are closed. The plastic mixing circuit 233 controls the mixing and injection of molding material such as polyurethane into mold 11.

When switches 35a, 55a are closed, switches 35c 55c are opened to deenergize solenoid 229. This, in turn, permits valve 187 to return to its spring centered closed condition to relieve pressure on tilt beam cylinder 63.

Relay 235 also includes relay contacts 235b in branch 215 for initiating operation of a cure cycle timer 237 for timing the curing cycle of the molding material which is injected into the mold. Incorporated within cure cycle timer 237 is a switch 239 which is closed by timer 237 at the end of the timing cycle. Connected in series with switch 239 is a relay 241 with contacts 241a in branch 212 for controlling the opening of the mold and with normally closed contacts 241b in branch 210 for deenergizing (when opened) the components of branches 210 and 211 at the end of the timing cycle. Also, in circuit with relay 243 is a switch 261 for manually initiating the mold opening cycle. Switch 261a is linked to switch 261 for preventing simultaneous energization of branch 210 having mold closing components. In circuit with relay contacts 241a is a relay 243 with contacts 243a in branch 213. Relay contacts 243a control the energizing of solenoid 245 for retracting hydraulic cylinders 29-32, 51-54 (via valve 177) to open quadrant slides 25, 27. When quadrant slides 25, 27 have reached the open position, limit switches 35b, 55b are closed to actuate a solenoid 247 in series therewith. Solenoid 247 controls (via valve 187) the retraction of the piston 65 of hydraulic cylinder 63 to lower tilt beam 61 to its mold open position. When tilt beam 61 reaches its mold open position, limit switch 64b is closed to actuate a solenoid 249 for controlling (via valve 181) the retraction of hydraulic cylinders 115, 121. When slide assemblies 103, 105 reach their workpiece disengaging positions, limit switches 114b, 120b are closed which in turn actuate a relay 251 in circuit therewith. Relay 251 has a pair of normally closed contacts in branch 212 for deenergizing (when opened) relay 243, solenoid 245 and solenoid 249 thereby completing a molding cycle of mold 11.

In operation, circuit 201 controls automatically or manually the operation of mold 11 as follows. Referring to FIGS. 2, 4, 13 and 14, a mold cycle is initiated by pushing start switch 203 which energizes motor 195 for hydraulic pump 191 with power applied to branch 209. Solenoid 219 is energized to initiate water cooling assembly 202 for the hydraulic circuit shown in FIG. 13. Next, pushbutton 223 is pushed energizing relay 225 to close relay contacts 225a, 225b. Assuming manual-/automatic selector switch 221 is in the automatic position placing switch junctions 221a, 221b in a closed condition, relay 225 is locked in the energized condition through switch 221a and contacts 225a. With relay contacts 225b closed, solenoid 227 is energized to extend hydraulic cylinders 115, 121 (via valve 181) thereby moving slide assemblies 103, 105 to the workpiece engaged position. When slide assemblies 103, 105 reach the workpiece engaged position, actuators 116, 122 close limit switches 114a, 120a energizing solenoid 229. When solenoid 229 is energized, hydraulic cylinder 63 is extended (via valve 187) to move tilt beam 61 from its open to its closed position. When tilt beam 61 reaches its closed position, actuator rod 66 closes limit switch 64a. The closing of limit switch 64a energizes solenoid 231. Solenoid 231, when energized, causes hydraulic cylinders 29-32, 51-54 to be extended (via valve 177) to move quadrant slides 25, 27 from the mold open to the mold closed position. When quadrant slides 25, 27 reach the mold closed position, actuator rods 39, 56 close limit switches 35a, 55a to energize relay 235 through switch 221b. At this time the mold is closed, plastic mixing circuit 233 is activated via switch 235a and the molding material is mixed and injected. Also, when switches 35a, 55a are closed, switches 35c, 55c are opened, thereby deenergizing solenoid 229. When solenoid 229 is deenergized, spring centered valve 187 closes and the pressure on hydraulic cylinder 63 is relieved. Tilt beam 61 remains in its mold closed position as it is locked in place by plates 70, 72, 74, 76, 78, 80 of quadrant slides 25, 27.

Also, when relay 235 is energized, cure cycle timer 237 is energized via now closed contacts 235b. When the cure cycle time expires, the timer closes switch 239, thereby energizing relay 241. In branch 210, relay contacts 241b are opened (1) deenergizing relay 225, then contacts 225b are open energizing solenoid 227 which permits spring centered valve 181 to close and relieve the pressure on cylinders 115, 121 for slide assemblies 103, 105, (2) deenergizing solenoid 231 to relieve the pressure on cylinders 29-32, 51-54 via valve 177 and (3) deenergizing relay 235 to open relay contacts 235b for deenergizing timer 237.

In addition, when relay 241 is energized, contacts 241a, 225c are switched to a closed condition, relay contacts 251a remain closed and solenoid 243 is thus energized. Energization of solenoid 243 closes contacts 243a energizing solenoid 245 for retracting cylinders 29-32, 51-54, via valve 177 thereby moving quadrant slides 25, 27 to their mold open position. When quadrant slides 25, 27 reach the mold open position, limit switches 35b, 55b are closed by actuators 39, 56 thereby energizing solenoid 247. When solenoid 247 is energized, hydraulic cylinder 63 is retracted via valve 187 thereby moving tilt beam 61 from the mold closed to the mold open position. When the tilt beam 61 reaches the mold open position, limit switch 64b is closed. The closing of limit switch 64b simultaneously opens linked switch 64c thereby deenergizing solenoid 247 and thus relieving the pressure on cylinder 63 with the return of valve 187 to the closed condition. Also, when limit switch 64b is closed, solenoid 249 is actuated which retracts hydraulic cylinders 29-32, 51-54 (via valve 197) to move quadrant slides 25, 27 to the mold open position. When the mold open position is reached, switches 114b, 120b are closed by actuators 39, 56 to energize relay 251 and open relay contacts 251a. The opening of contacts 251a deenergizes relay 243, and opens contacts 243a. The opening of contacts 243a deenergizes solenoid 245a relieving the pressure on hydraulic cylinders 29-32, 51-54 (via valve 177) and deenergizes solenoid 249, relieving the pressure on hydraulic cylinders 115, 121 (via valve 181) for slide assemblies 103, 105. The mold cycle is thus completed and the workpiece may be removed from the mold.

Mold 11 may also be cycled manually. For manual operation, selector switch is set on manual, placing switches 221a and 221b in an open condition. Motor 195 is energized through pushbutton 203 as in the automatic cycle. Button 223 is then pushed to energize relay 225. The mold cycle is then automatically continued as in the fully automatic cycle up to the point of energizing relay 235 which is not done because contacts 221a are open. The injection of the molding material is initiated manually through means not shown. Thereafter after the proper curing time the mold is opened by opening switch 261a preventing relay 225 and the components of branch 211 from being energized. When relay 225 is deenergized, relay contacts 225c are normally closed (as is relay contacts 251a). When relay contact switches 261 linked with switch 261a are closed, relay 243 is actuated. Following the actuation of relay 243, the mold 11 is opened in the same manner as in the automatic cycle and is similarly terminated with the energization of relay 251 and with the opening of relay contacts 251a deenergizing branches 212, 213.

This invention has been explained in accordance with a preferred embodiment thereof. It will be recognized that modifications and other embodiments of the invention may be made within the scope of this invention. As an example, the mold is specially designed for moding of a conditioner roll and thus the workpiece shape dictates in part the shape of the quadrants used to form the mold cavity. Other workpieces would require a modification of the mold. The tread design placed on the outer plastic layer of certain conditioner rolls requires four quadrants to form the mold cavity. However, other parts with a different tread design or smooth outer surface, need not have four quadrants and may have two or three mold segments to form the mold cavity. More specifically, a mold could be comprised of two semicircular mold segments, one being fixed in a generally vertical orientation and the second pivotably mounted relative to the first between a vertically oriented closed position for forming a mold cavity and an inclined open position for loading of a workpiece thereon.

In addition, the term quadrant is used herein in a general sense to mean a component (in cross section) shaped like or suggestive of a quadrant of a circle. The term inclination in reference to the location of the pivotable quadrant or segment (on which the workpiece is mounted), relative to the vertically oriented quadrant, at the time of locating the workpiece thereon includes a 0 degree angle (i.e., a horizontal orientation). Accordingly, it is intended that all such modification, variations and alternate embodiments as are within the true spirit and scope of this invention be comprehended by the appended claims.

We claim:

1. A machine for molding an elongated workpiece comprising:
   a first, elongated, generally vertically oriented quadrant;
   a second, elongated, generally vertically oriented quadrant movable toward and away from said first quadrant between a closed and an open position, respectively;
   a third, elongated, generally vertically oriented quadrant opposed to said second quadrant and movable toward and away from said first quadrant between a closed and an open position, respectively; and
   a fourth, elongated quadrant means pivotably mounted at one end relative to said first quadrant and movable toward and away from said first quadrant between a generally vertically oriented closed position and an inclined, open position, said fourth quadrant means for (a) defining a mold cavity with said first, second and third quadrants when said second and third quadrants and said fourth quadrant means are in the closed position, (b) receiving a workpiece core thereon when in the open position, (c) loading said workpiece core into said mold cavity by movement from the open to the closed position, and (d) unloading a molded workpiece from said cavity by movement from the closed to the open position.

2. The machine of claim 1, further comprising first and second quadrant slides, respectively, movably mounting said second and third quadrants for movement in a horizontal direction.

3. A machine for molding an elongated workpiece comprising:
   a first, elongated, generally vertically oriented mold segment; and
   a second, elongated mold segment means pivotably mounted at one end relative to said first segment and movable toward and away from said mold segment between a generally vertically oriented closed position and an inclined, open position, said second segment means for (a) defining at least in part a mold cavity with said mold segment when said second segment means is in said closed position, (b) receiving a workpiece core thereon when in the open position, (c) loading said workpiece core into said mold cavity by movement from the open to the closed position, and (d) unloading a molded workpiece from said cavity by movement from the closed to the open position.

* * * * *